J. S. GRIFFITH.
Air-Purifying Attachments for Registers.

No. 152,744. Patented July 7, 1874.

Witnesses.

Inventor
James S. Griffith.
by
Mason Fenwick Lawrence

UNITED STATES PATENT OFFICE.

JAMES S. GRIFFITH, OF ST. LOUIS, MISSOURI.

IMPROVEMENT IN AIR-PURIFYING ATTACHMENTS FOR REGISTERS.

Specification forming part of Letters Patent No. 152,744, dated July 7, 1874; application filed June 15, 1874.

*To all whom it may concern:*

Be it known that I, JAMES S. GRIFFITH, of St. Louis, county of St. Louis and State of Missouri, have invented a new and useful Improvement in Deflecting and Air-Purifying Attachments for Steam, Hot-Air, and other Registers; and I do hereby declare that the following is a full, clear, and exact description thereof, reference being had to the accompanying drawings making part of this specification, in which—

Figure 1:
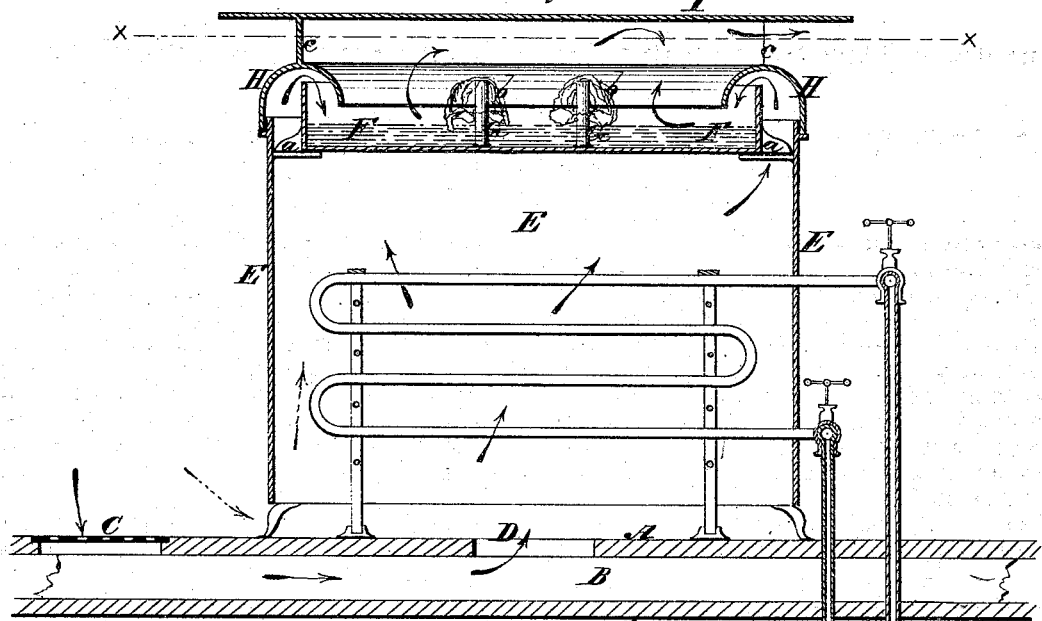
Figure 2:
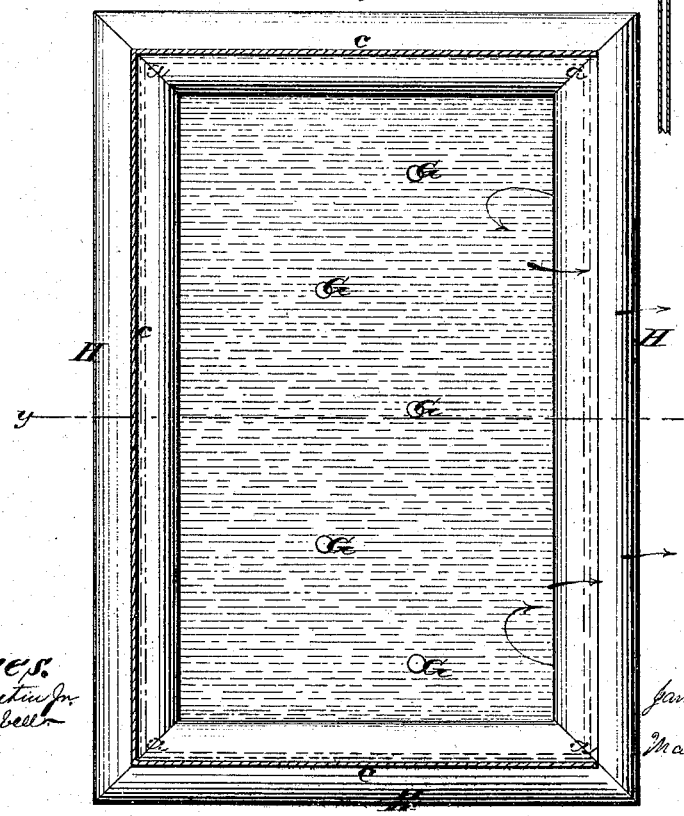

Figure 1 is a vertical central section of my invention applied as a radiator-cover in the line $x\ x$. Fig. 2 is a horizontal section of the same in line $y\ y$ of Fig. 1.

The nature of my invention consists in a vessel, for containing water or other purifying or washing agents, arranged within a chamber heated either directly or indirectly by air or steam, said vessel being isolated all round, or to any extent necessary, from the inner sides of said chamber, in combination with a deflector pendent from the upper edges of said vessel, and with an elevated hood, which forms the top of the chamber, and which has an escape passage or passages through its sides or other parts, for the emission of the heated and purified air into a room.

A represents a base, constructed with an air-trunk, B, a cold-air register, C, and a passage, D, for the air supplied at C to enter into the chamber E.

In the drawings I have shown a steam-coil as the heater used; but the intention is to either heat the chamber by hot air discharged directly into the same through a register placed at D, or by steam passed through coils of pipe arranged within the chamber. I have also shown the chamber open at its bottom, and isolated from the base by legs. When this construction is adopted the trunk A with its passages is dispensed with, as the air will pass under the lower edges of the cover into the chamber; and when the base A with its passages is used, the chamber may have its lower edges fitted tight down upon the base, so as to exclude the entrance of air.

F is the vessel in which water or other purifying liquid is placed. It is made of smaller area than the register-cover or chamber E, and supported at its four corners $a$ upon the walls of the chamber, so as to have a free space between the end and side walls of the chamber. G are the studs, extending up above its edge from the bottom of the vessel. This vessel is constructed of asbestus or other non-conducting material, so that it shall not too rapidly heat the water within it. On the studs cloths or some porous material saturated with water are placed, as illustrated at $b$, for the purpose of depriving the hot air of any impurities which may not be washed out of it in its passage over the surface of the water in the vessel. H is the hot-air deflector. It is formed upon the upper edge of the chamber E, and extends inward and upward, and then downward, so as to overhang the edges of the vessel, but not to extend down into the water contained in the same. This deflector, in cross-section, is in form of a semi-cylinder; but it may be of other form, provided it deflects and depresses the air against the surface of the water in its passage to the room which it is to heat. I is the cap or hood of the chamber. It is shown in the drawings as a flat plate supported upon vertical sides $c\ c$, but it may be of arching, spherical, or other form. In one or more of the vertical sides of this hood escape-passages are to be made; or, as shown in the drawings, one of the vertical sides is left out entirely to form the escape-passage for the hot purified air.

The vessel being partly filled with water, and the cloths $b$ saturated with the same fluid by capillary attraction, and the chamber supplied with heat, the cold air enters either directly under the edges of the chamber or through the trunk, and, becoming heated, passes around the outside of the vessel, then against the deflector, and by the latter is caused to pass down into the vessel and over the surface of the water, and in contact with the cloths, and then up against the hood and out through the escape-passage into the room.

The water and saturated cloths deprive the air of its impurities, and thus those who take it into their lungs are saved from the injury experienced from breathing impure hot air.

In practice the studs, and cloths placed on the same, may be dispensed with, if thought desirable, as the water in the vessel will purify the air sufficiently to prevent injury from its inspiration. This apparatus will also save the walls of a room from being discolored by the impurity of the air.

I am aware that it is not new to deflect warm air down upon water in a vessel in its passage from a hot-air register to a room, this being shown in O. A. Eberts' patent of February 15, 1870; but I am not aware that a cover containing a water-vessel which is isolated all around, except at the corners where it has its supports from the exterior wall of the case, and is overhung by an inverted deflecting-gutter on all its edges, and capped with a deflecting-hood, has ever been devised. Nor am I aware that such a cover with the water-vessel, and with the inverted deflecting-gutter and capping-hood, has been contrived so as to receive within it steam or other radiator pipes, and to permit the circulation of currents of cold or fresh air around the said radiator-pipes, and then over the water in the purifying-vessel. Therefore, while I do not claim anything shown in Eberts' patent, What I do claim as new is—

1. The cover E, having the inverted gutter-shaped deflector H and the perforated hood I applied upon its upper edge, in combination with the isolated water-vessel F, arranged in the upper part of the cover, substantially in the manner herein described, and for the purpose set forth.

2. The combination of the cover E, hood I, deflector H, and water-vessel F, having cloth-supporting studs G projecting up from its bottom, the whole constructed and operating in the manner herein described, and for the purpose set forth.

3. The combination of a cover, E, into which cold or fresh air is admitted, the water-vessel F, the deflector H, the hood I, the trunk B, the passage D, and the passage C, substantially in the manner and for the purpose set forth.

JAMES S. GRIFFITH.

Witnesses:
J. N. CAMPBELL,
JAMES MARTIN, Jr.